Patented Oct. 30, 1945

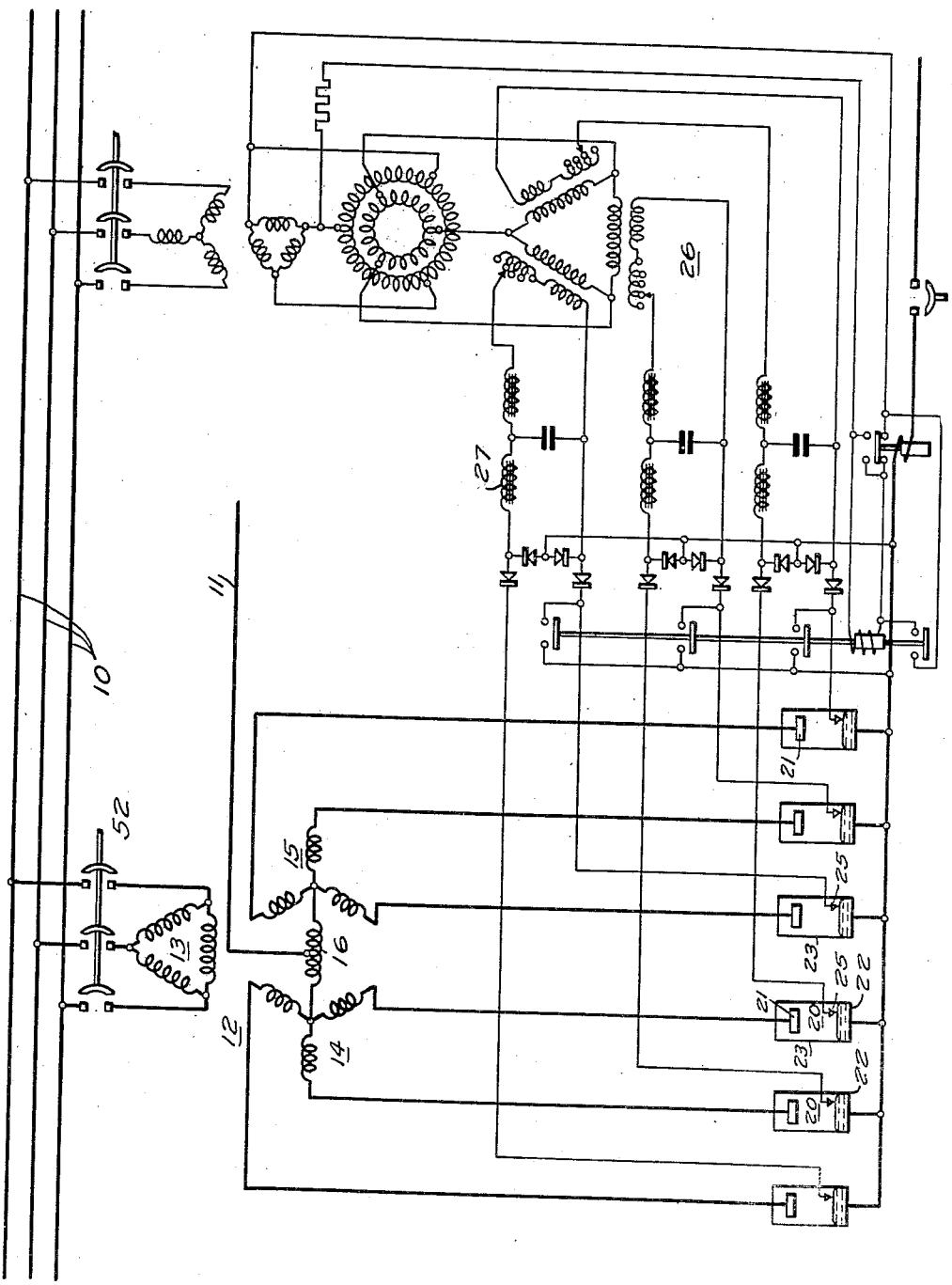

2,387,946

UNITED STATES PATENT OFFICE 2,387,946

VAPOR-ELECTRIC DEVICE

Herbert A. Rose, Pittsburgh 21, and Joseph H. Cox, Forest Hills, Pa., assignors to Westinghouse Electric Corporation, East Pittsburgh, Pa., a corporation of Pennsylvania Application December 15, 1942, Serial No. 469,108

9 Claims. (Cl. 175—363)

Our invention relates to a vapor-electric device and, particularly, to a system for preventing low load voltage rise in a power rectifier system.

In the operation of vapor-electric devices, such as rectifiers, the utility factor of the equipment decreases with increase in the actual number of phases undergoing rectification. For example, in a byphase (so-called single phase) rectifier, each anode is operative half of the time, while in the three-phase rectifier, each anode is operative only for one-third of the period. Likewise, a six-phase rectifier is operative only for one-sixth of the time. It is desirable to have the effect of multiple-phase operation to eliminate inequalities or so-called ripple in the rectified potential. In order to secure the benefits of a small number of operating phases and the terminal effect of a large number of phases. It has heretofore been customary to provide polyphase systems having interphase transformers to produce multiple polyphase operation. For example, two three-phase groups may be interconnected by an interphase transformer to secure double three-phase operation with the terminal effect of six phase operation and the utilization effect of three-phase operation.

The use of interphase transformer to secure multiple polyphase operation has certain drawbacks in that at low loads, the load current is not sufficient to excite the interphase transformer so that the interphase voltage collapses, allowing the multiple polyphase system to revert to its straight phase operation. This is highly detrimental to the direct-current system as the collapse of the interphase voltage produces the so-called low load voltage rise. For instance, when a double three-phase rectifier reverts to six-phase operation, the voltage will increase 15%, or a total of 115% of the common load voltage. This voltage rise will in many cases injure equipment such as lights, control equipment, or even motors connected to the direct-current circuit.

We have found that in multiple-phase operation, the low load voltage rise may be prevented by terminating current flow in one or more of the polyphase groups composing the rectifier system. While this does not prevent the collapse of the interphase voltage, it does prevent the increase in the effective phase operation and thus prevents the low load voltage rise.

With this make-alive rectifier system, it is possible to prevent operation of the several valves by short-circuiting or shunting out the make-alive electrode by any means such as a switch connecting the make-alive lead directly to the cathode of the valve.

In the system according to our invention, we utilize these means to short out or render inoperative the make-alive electrodes in certain of the polyphase groups so that the groups carry no current, and, therefore, prevent the low load voltage increase.

It is, accordingly, an object of our invention to provide a conversion system having a substantially constant potential at both low and normal load levels.

It is a further object of our invention to provide means for rendering selected valves of a rectifier system inoperative in response to load conditions.

It is a further object of our invention to provide means for controlling terminal voltage of a vapor-electric converter.

Other objects and advantages of our invention will be apparent from the following detailed description taken in conjunction with the accompanying drawing, in which the single figure is a schematic illustration of a vapor-electric device embodying our invention.

In the illustrative embodiment of our invention, a polyphase alternating-current circuit herein illustrated as a three-phase circuit 10 is connected to a direct-current circuit 11 by means of a rectifier transformer 12 having a primary winding 13 connected to the circuit 10 by means of a breaker 52. The secondary winding of the transformer 12 is composed of a plurality of polyphase winding groups, 14 and 15 preferably of a star-connected variety. For simplicity of illustration, we have shown only two such winding groups interconnected by means of an interphase transformer 16 which forms the connection between the plurality of polyphase winding groups and one side of the direct-current circuit 11. Each phase terminal 1 to 6 of each of the phase groups is connected to the opposite side of the direct-current circuit 11 by means of a vapor-electric valve 20, herein illustrated as of the make-alive type. Each of the valves 20 comprises an anode 21 and a vaporizable cathode 22 enclosed in a suitable container 23 which may be evacuated, and the conduction of each valve 20 is determined by means of a make-alive electrode 25 in contact with the cathode 22, the make-alive electrode 25 being energized from any suitable source of alternating potential, such as the alternating-current circuit 10 by means of an impulsing system 26 herein illustrated as of the wave distorter type in which a saturating reactor 27 controls the flow of currents from the source to the make-alive electrode 25. The make-alive electrodes 25 of the valves 20 connected to one of the secondary winding groups such as 15 are provided with control means for inhibiting the flow of current from the impulsing system through the make-alive electrode. We have accomplished this by providing a switching device in shunt from the base connection of the make-alive electrode to the associated cathode, so that when the switch is closed, the make-alive electrode is short-circuited or shunted out so that substantially no current can flow therein.

A control switch is, in turn, controlled by a suitable relay responsive to the load condition of the rectifier. Herein we have shown the control switches as being, in turn, controlled by a load responsive relay of the current type connected directly in the load circuit. However, it is apparent that a voltage relay connected across the terminals of the interphase transformer could be used instead of the current relay in the load circuit.

In the operation of the system according to our invention, current flows from the secondary windings through the valves to the direct-current circuit. The current flowing in this direct-current circuit energizes the load controlling relay, and if the current is sufficiently high, the relay picks up, shorting out the operating coil of the control switches, allowing these switches to drop out and permits current flow to all of the make-alive electrodes so that the rectifier operates under normal load at normal voltage. If the load current should decrease to a value insufficient to maintain the relay in its closed position, it will drop out, closing its back contacts, energizing the operating coil of the control switch which will close its contacts and short circuit or shunt out their associated make-alive electrodes and prevent the associated valves from carrying current. The closing of the control switch likewise closes in a locking contact so that minor disturbances of the load responsive relay will not produce chattering or misoperation of the control switch. However, it is apparent that when the current rises to a value to close the load responsive relay, the operating coil would be completely shunted out, thereby releasing not only the control switch, but the associated lock-in switch.

While for purposes of illustration, we have shown and described a specific embodiment of our invention, it will be apparent that changes and modifications can be made therein without departing from the true spirit of our invention or the scope of the appended claims.

We claim as our invention:

1. An electric translating device interconnecting a polyphase A. C. circuit and a direct current circuit comprising a transformer having a polyphase winding connected to the alternating-current circuit, a plurality of polyphase windings electrically insulated from said first-mentioned winding, interphase transformer means electrically connected between said plurality of polyphase windings and to one side of said direct-current circuit and being energized by the current flowing between the circuits, an electric valve of the make-alive type between each phase terminal of said plurality of windings and the other side of the direct-current circuit, a make-alive electrode for each of said valves, impulsing means for periodically impressing make-alive potential on said make-alive electrodes, means for suppressing the flow of current from said impulsing means to the make-alive electrodes of the valves connected to the phase terminals of one of said polyphase windings and load responsive means for actuating said suppressing means.

2. An electric current conversion system comprising a polyphase winding, a plurality of star-connected polyphase windings inductively coupled to said first-mentioned winding, auxiliary winding means interconnecting said star-connected windings, vapor electric discharge devices of the make-alive type connected to the terminals of the star-connected windings, a make-alive electrode in each of said discharge devices, means for periodically energizing said make-alive electrodes, switching means providing a shunt path around the make-alive electrodes of the valves connected to a portion of said star-connected polyphase windings, and relay means for determining the operation of said switching means.

3. An electric current conversion system comprising a polyphase winding, a plurality of star-connected polyphase windings inductively coupled to said first-mentioned winding, auxiliary winding means interconnecting said star-connected windings, vapor electric discharge devices of the make-alive type connected to the terminals of the star-connected windings, a make-alive electrode in each of said discharge devices, means for periodically energizing said make-alive electrodes, switching means in shunt circuit relation with the make-alive electrodes of the valves connected to all but one of the star winding groups and current responsive relay means for actuating said switching means.

4. An electric translating system interconnecting a polyphase alternating-current circuit and a direct-current circuit comprising a transformer having a polyphase winding connected to the polyphase circuit and a plurality of polyphase winding groups, interphase transformer means for connecting said winding groups to one side of the direct-current circuit, electric valves for connecting the terminals of said winding groups to the other side of the direct-current circuit, a cathode-spot initiating electrode in each of said valves, means for impressing control potential on said exciting electrodes, switching means associated with the exciting electrodes of all but one group of valves and load current responsive means for actuating said switching means to control the application of control potential to said cathode-spot initiating electrodes.

5. An electric translating system interconnecting a polyphase alternating-current circuit and a direct-current circuit comprising a transformer having a polyphase winding connected to the polyphase circuit and a plurality of polyphase winding groups, interphase transformer means for connecting said winding groups to one side of the direct-current circuit, electric valves for connecting the terminals of said winding groups to the other side of the direct-current circuit, a make-alive electrode in each of said valves, means for impressing control potential on said make-alive electrodes, switching means connected between the make-alive electrodes and the cathodes of the valves of all but one group of valves and load responsive relay means for determining the operation of said switching means.

6. An electric current conversion system for transferring electric energy between a polyphase alternating-current circuit and a direct-current circuit comprising a transformer having a polyphase winding connected to the alternating-current circuit, a plurality of polyphase winding groups inductively coupled to said first-mentioned winding, interphase transformer means for connecting said winding groups to one side of the direct-current circuit, vapor-electric valve means for connecting the terminals of said winding groups to the other side of the direct-current circuit, a make-alive electrode for each valve means, an impulsing device for periodically applying make-alive impulses to said make-alive electrodes, control means connected in shunt with certain of said make-alive electrodes for rendering them inoperative and load responsive means for actuating said control means.

7. An electric current conversion system for transferring electric energy between a polyphase alternating-current circuit and a direct-current circuit comprising a transformer having a polyphase winding connected to the alternating-current circuit, a plurality of polyphase winding groups inductively coupled to said first-mentioned winding, interphase transformer means for connecting said winding groups to one side of the direct-current circuit, vapor-electric valve means for connecting the terminals of said windings to the other side of the direct-current circuit, a make-alive electrode for each of said valve means, an impulsing device for periodically applying make-alive impulses to said make-alive electrodes, switching means associated in shunt relation with the said make-alive electrodes of the valve means connected to one of said winding groups for rendering them inoperative and load responsive means for actuating said switching means.

8. An electric current conversion system for transferring electric energy between two dissimilar electric circuits one of which is a polyphase alternating current circuit comprising vapor-electric valve means for transferring current between the circuits, transformer means for distributing potential in said valve means, a make-alive electrode for each of said valve means, means for periodically applying energy to said make-alive electrodes and load responsive means for rendering a portion only of said make-alive electrodes inoperative for changing the mode of operation of said system.

9. An electric translating system interconnecting a polyphase alternating-current circuit and a direct-current circuit comprising a transformer having a polyphase winding connected to the polyphase circuit and a plurality of polyphase winding groups, means for connecting said winding groups to one side of the direct-current circuit, electric valves for connecting the terminals of said winding groups to the other side of the direct-current circuit, a cathode spot initiating electrode in each of said valves, means for impressing control impulses on said electrodes, switching means connected between the cathode spot initiating electrodes and the cathodes of the valves of all but one group of valves and a load responsive relay for determining the operation of said switching means.

HERBERT A. ROSE.
JOSEPH H. COX.